(12) United States Patent
Liu et al.

(10) Patent No.: US 10,691,285 B2
(45) Date of Patent: Jun. 23, 2020

(54) METHOD AND DEVICE FOR DISPLAYING FLOATING WINDOW

(71) Applicant: Beijing Xiaomi Mobile Software Co., Ltd., Beijing (CN)

(72) Inventors: Ming Liu, Beijing (CN); Le Wang, Beijing (CN); Baolin Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 176 days.

(21) Appl. No.: 16/032,755

(22) Filed: Jul. 11, 2018

(65) Prior Publication Data
US 2019/0025988 A1  Jan. 24, 2019

(30) Foreign Application Priority Data
Jul. 19, 2017  (CN) .......................... 2017 1 0591479

(51) Int. Cl.
*G06F 3/0481*  (2013.01)
*G06F 9/451*  (2018.01)
(Continued)

(52) U.S. Cl.
CPC .......... *G06F 3/0481* (2013.01); *G06F 3/0486* (2013.01); *G06F 3/04842* (2013.01);
(Continued)

(58) Field of Classification Search
None
See application file for complete search history.

(56) References Cited

U.S. PATENT DOCUMENTS

2010/0138763 A1\* 6/2010 Kim ...................... G06F 1/1626
                                                                        715/765
2016/0103600 A1\* 4/2016 Vranjes ............... G06F 3/04847
                                                                        715/789

FOREIGN PATENT DOCUMENTS

CN       104346216 A      2/2015
CN       105426189 A      3/2016
(Continued)

OTHER PUBLICATIONS

Extended European Search Report dated Dec. 11, 2018 in European Patent Application No. 18184403.6, 9 pages.
(Continued)

*Primary Examiner* — Tuan S Nguyen
(74) *Attorney, Agent, or Firm* — Oblon, McClelland, Maier & Neustadt, L.L.P.

(57) ABSTRACT

The disclosure relates to a method and device for displaying a floating window. The method includes monitoring an amount of floating windows that are created on a desktop for respective ones of a plurality of applications; determining that there is more than one of the plurality of applications for which a floating window is created on the desktop; forbidding permissions of multiple floating windows based on the determination; launching a system floating window; hiding and containing the multiple floating windows in the system floating window; receiving an activating instruction for the system floating window; extending and displaying the multiple floating windows contained in the system floating window; receiving a selection instruction for the multiple floating windows; displaying a selected floating window of the multiple floating windows; allowing a permission of the selected floating window; and masking a permission of the system floating window.

18 Claims, 12 Drawing Sheets

(51) Int. Cl.
*G06F 3/0484* (2013.01)
*G06F 3/0486* (2013.01)
*G06F 3/0488* (2013.01)

(52) U.S. Cl.
CPC .......... *G06F 3/04886* (2013.01); *G06F 9/451* (2018.02); *G06F 2203/04803* (2013.01)

(56) References Cited

FOREIGN PATENT DOCUMENTS

| | | |
|---|---|---|
| CN | 104322040 B | 4/2016 |
| CN | 106598396 A | 4/2017 |

OTHER PUBLICATIONS

Anonymous: "Bundled Notifications in Android I DiscoverSDK Blog", Nov. 12, 2016 (Nov. 12, 2016), pp. 1-5, XP055462182, Retrieved from the Internet: URL:http://www.discoversdk.com/blog/bundled-notifications-in-android [retrieved on Mar. 22, 2018] * p. 2-p. 4 *.

Lake Ian: "Android Developers Blog: Notifications in Android N". Jun. 8, 2016 (Jun. 8, 2016), XP055529294, Retrieved from the Internet: URL: https://android-developers.googleblog.com/2016/06/notifications-in-android-n.html [retrieved on Dec. 3, 2018] * p. 7-p. 8 * * p. 3-p. 4 *.

Chinese Office Action and Search Report dated Jul. 22, 2019, in Patent Application No. 201710591479.4, 7 pages (with English translation of Search Report).

* cited by examiner

METHOD AND DEVICE FOR DISPLAYING FLOATING WINDOW

CROSS-REFERENCE TO RELATED APPLICATIONS

This application is based upon and claims priority to Chinese Patent Application No. 201710591479.4, filed on Jul. 19, 2017, the entire contents of which are incorporated herein by reference.

TECHNICAL FIELD

The present disclosure generally relates to the field of communications, and more particularly, to a method and device for displaying a floating window.

BACKGROUND

Along with the progress of terminal equipment into a smart-phone age, terminal equipment with a large screen (particularly a touch screen) become more popular, and more Applications (APPs) are installed on the terminal equipment. In order to meet requirements of users on operational flexibility and the like, a floating window may be utilized. The floating window usually floats on a display interface in a transparent or semitransparent manner to provide some extended functions of an APP for a user. For example, a floating window of a security type APP may provide functions of cleaning, acceleration, and the like, for a user on any display interface. As another example, a floating window of a game APP may provide functions of gift bag receiving, game currency charging, and the like, for the user. Since more APPs are installed on the terminal equipment and many APPs have floating windows, multiple floating windows may be displayed on a desktop of the terminal equipment.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for displaying a floating window. The method includes monitoring an amount of floating windows that are created on a desktop for respective ones of a plurality of applications; determining that there is more than one of the plurality of applications for which a floating window is created on the desktop; forbidding permissions of multiple floating windows based on the determination; launching a system floating window; hiding and containing the multiple floating windows in the system floating window; receiving an activating instruction for the system floating window; extending and displaying the multiple floating windows contained in the system floating window; receiving a selection instruction for the multiple floating windows; displaying a selected floating window of the multiple floating windows; allowing a permission of the selected floating window; and masking a permission of the system floating window.

According to one aspect, the method also includes determining that the selected floating window meets a containing condition; forbidding the permission of the selected floating window based on the determination; starting and displaying the system floating window; and hiding and containing the multiple floating windows in the system floating window.

In an example, the containing condition includes one of (i) a detection that a display time of the selected floating window reaches a first preset time, and (ii) a detection of a preset operation, wherein the preset operation includes any one of an unlocking operation, a shaking operation, and a pressing operation over a specific button.

According to one aspect, the method includes detecting an operation of creating a new floating window for one of the plurality of applications on the desktop; forbidding a permission of the new floating window based on the detection; and hiding and containing the new floating window in the system floating window.

According to another aspect, the method includes detecting an operation of terminating a previously created floating window for one of the plurality of applications on the desktop; removing a permission of the terminated floating window; and removing information of the terminated floating window from the floating windows hidden and contained in the system floating window.

According to yet another aspect, the method includes receiving a setting instruction for the system floating window; and setting the system floating window based on setting contents in the setting instruction.

Aspects of the disclosure also provide a device for displaying a floating window. The device includes a processor and a memory for storing instructions executable by the processor. The processor is configured to monitor an amount of floating windows that are created on a desktop for respective ones of a plurality of applications; determine that there is more than one of the plurality of applications for which a floating window is created on the desktop; forbid permissions of multiple floating windows based on the determination; launch a system floating window; hide and contain the multiple floating windows in the system floating window; receive an activating instruction for the system floating window; extend and display the multiple floating windows contained in the system floating window; receive a selection instruction for the multiple floating windows; display a selected floating window of the multiple floating windows; allow a permission of the selected floating window; and mask a permission of the system floating window.

Aspects of the disclosure also provide a non-transitory computer-readable storage medium having stored therein instructions that, when executed by a processor of a terminal equipment, causes the terminal equipment to monitor an amount of floating windows that are created on a desktop for respective ones of a plurality of applications; determine that there is more than one of the plurality of applications for which a floating window is created on the desktop; forbid permissions of multiple floating windows based on the determination; launch a system floating window; hide and contain the multiple floating windows in the system floating window; receive an activating instruction for the system floating window; extend and display the multiple floating windows contained in the system floating window; receive a selection instruction for the multiple floating windows; display a selected floating window of the multiple floating windows; allow a permission of the selected floating window; and mask a permission of the system floating window.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Figure 1:
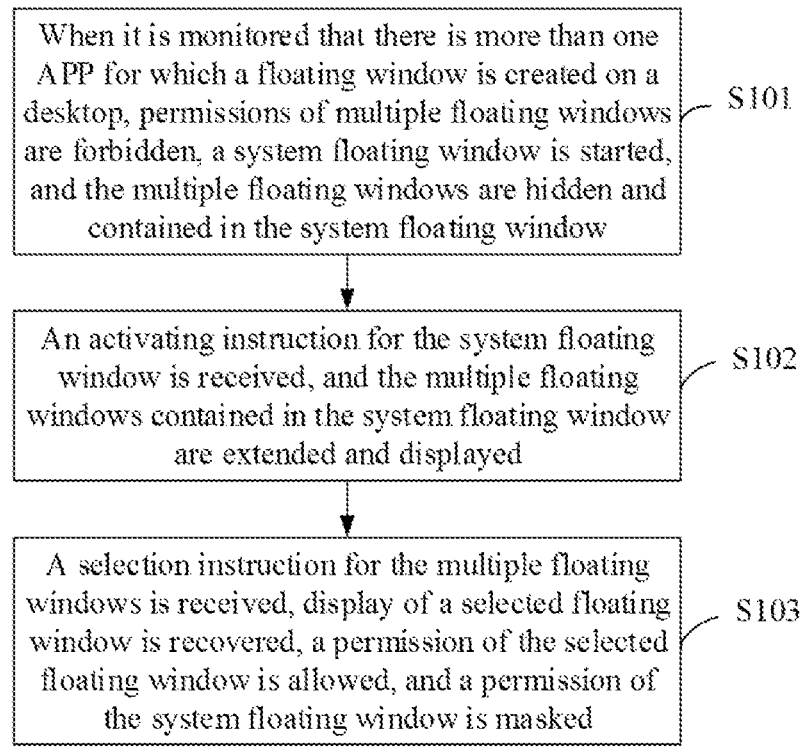
FIG. 1 is a flow chart showing a method for displaying a floating window, according to an exemplary aspect of the present disclosure.

FIG. 1 is a flow chart showing a method for displaying a floating window, according to an exemplary aspect. The method is executed by terminal equipment, and the terminal equipment may be a mobile phone, a tablet computer, a Personal Digital Assistant (PDA) and the like. As shown in FIG. 1, the method for displaying a floating window includes the following steps.

In step S101, when it is monitored (e.g., detected or determined) that there is more than one APP for which a floating window is created on a desktop, permissions of multiple floating windows are forbidden, a system floating window is started (e.g., launched), and the multiple floating windows are hidden and contained in the system floating window.

The terminal equipment monitors a number of the floating windows created on the desktop. If an Android system is used in the terminal equipment, specific APPs for which the floating windows are created on the terminal equipment may be read through an Android system interface. When the number of the floating windows on the desktop is more than one, the floating windows are simultaneously displayed on the desktop, which may make the desktop messy and influence attractive appearance of the desktop. Moreover, a user may accidentally touch a certain floating window when operating an APP icon on the desktop, thereby activating the APP corresponding to the floating window touched accidentally. The system floating window is added in this aspect so as to facilitate the management of the floating windows, and is configured to hide and contain the multiple floating windows.

Before the system floating window hides and contains the multiple floating windows in the terminal equipment, the permissions of the multiple floating windows are required to be forbidden, and the system floating window is started. The system floating window hiding and containing the multiple floating windows refers to that: when the system floating window is closed, only the system floating window is displayed on the desktop, and the floating windows contained in the system floating window are not displayed.

Figure 2:
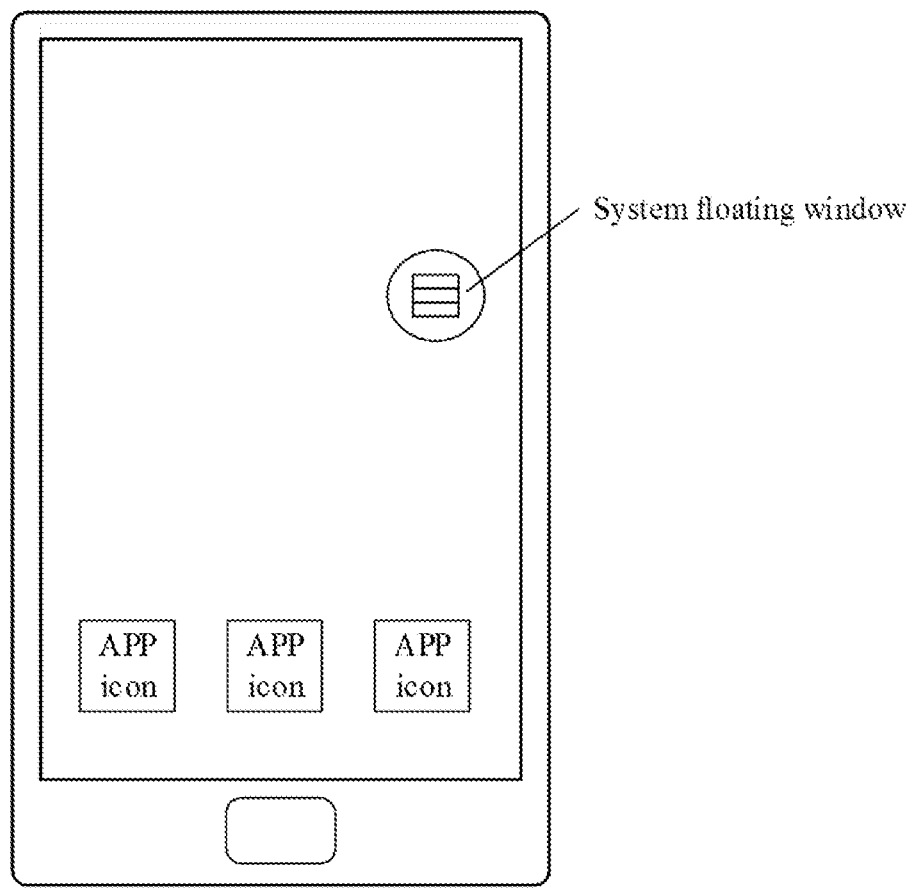
FIG. 2 is a schematic diagram illustrating a system floating window according to an exemplary aspect of the present disclosure.

FIG. 2 is a schematic diagram illustrating a system floating window. As shown in FIG. 2, the system floating window is a round window. A size of the system floating window may be the same as sizes of the floating windows of the APPs. The user may move the system floating window on the desktop in a dragging manner.

In step S102, an activating instruction for the system floating window is received, and the multiple floating windows contained in the system floating window are extended and displayed.

When the system floating window is closed, only the system floating window is displayed on the desktop of the terminal equipment, and the multiple floating windows in the system floating window are not displayed. When the user is required to activate the floating window of a certain APP, the user inputs the activating instruction for the system floating window, and the terminal equipment receives the activating instruction for the system floating window. The activating instruction may be clicking, sliding and dragging operations and the like over the system floating window, wherein the clicking operation may be a single-click operation or a double-click operation, and the sliding operation may be a leftward sliding, rightward sliding, upward sliding or downward sliding operation. The terminal equipment extends and displays the multiple floating windows contained in the system floating window according to the activating instruction.

Figure 3:
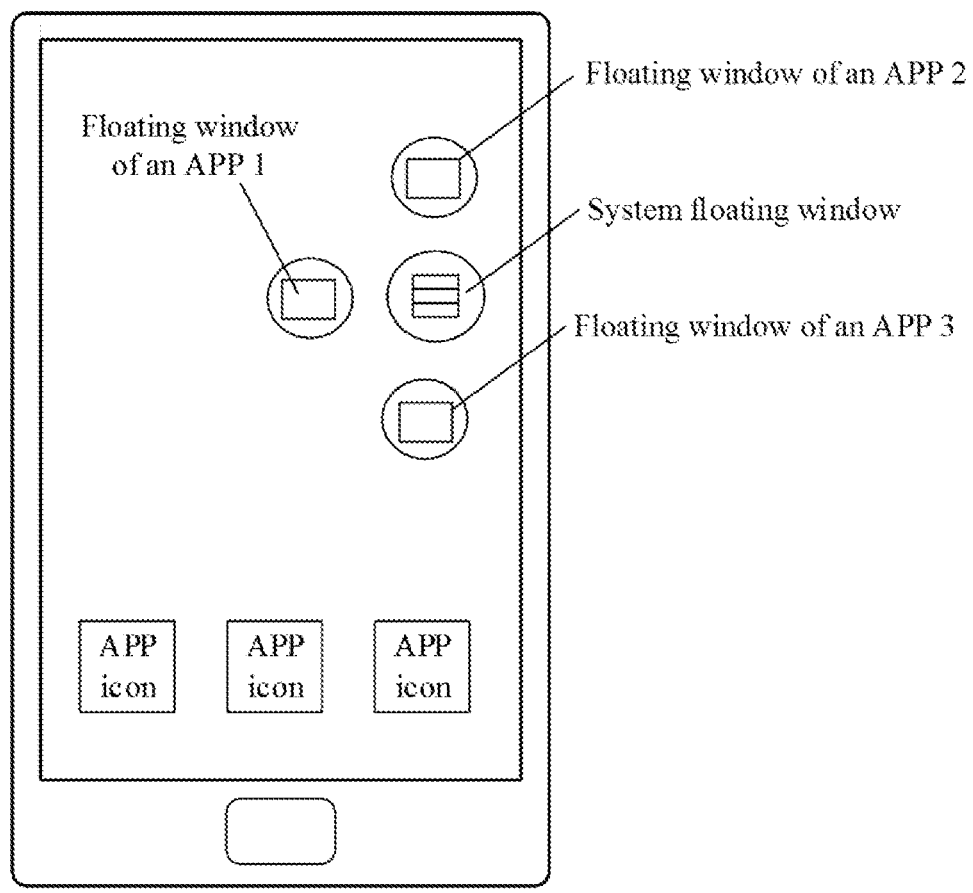
FIG. 3 is a schematic diagram illustrating extension and display of a system floating window according to an exemplary aspect of the present disclosure.

FIG. 3 is a schematic diagram illustrating extension and display of a system floating window. As shown in FIG. 3, the system floating window contains floating windows of totally three APPs: a floating window of an APP 1, a floating window of an APP 2 and a floating window of an APP 3. Three floating windows are displayed around the system floating window respectively, of course, a display manner for the floating windows is not limited, and the three floating windows may also be arranged in a row for display on an upper part, left part, right part or lower part of the system floating window.

In step S103, a selection instruction for the multiple floating windows is received, display of a selected floating window is recovered, a permission of the selected floating window is allowed, and a permission of the system floating window is masked/shielded.

After the multiple floating windows are extended and displayed, the user may select a floating window from the multiple floating windows. The selection instruction may be a clicking or sliding operation over the floating windows, wherein the clicking operation may be a single-click operation or double-click operation over the floating windows, and the sliding operation may be a leftward sliding, rightward sliding, upward sliding or downward sliding operation.

The terminal equipment recovers display of the selected floating window according to the selection instruction, allows the permission of the selected floating window, and masks the permission of the system floating window. After the permission of the system floating window is masked, only the selected floating window is displayed on the desktop, and the system floating window is hidden. Different from the related art where the multiple floating windows are displayed on the desktop to make the desktop messy, the method in this aspect only displays the floating window of a certain APP or the system floating window on a display interface at a certain moment, so that the display interface is clean and attractive in appearance, and the user may be prevented from accidentally touching the floating windows when the APPs on the desktop are normally operated.

In this aspect, when it is monitored that there is more than one APP for which the floating window is created on the desktop, the permissions of the multiple floating windows are forbidden, and the system floating window is started. The multiple floating windows are hidden and contained in the system floating window. The activating instruction for the system floating window is received, and the multiple floating windows contained in the system floating window are extended and displayed. The selection instruction for the multiple floating windows is received, display of the selected floating window is recovered, the permission of the selected floating window is allowed, and the permission of the system floating window is masked. The multiple floating windows are hidden and contained in the system floating window, and only the system floating window or the selected floating window is displayed on the desktop, so that the desktop is clean and attractive in appearance.

Figure 4:
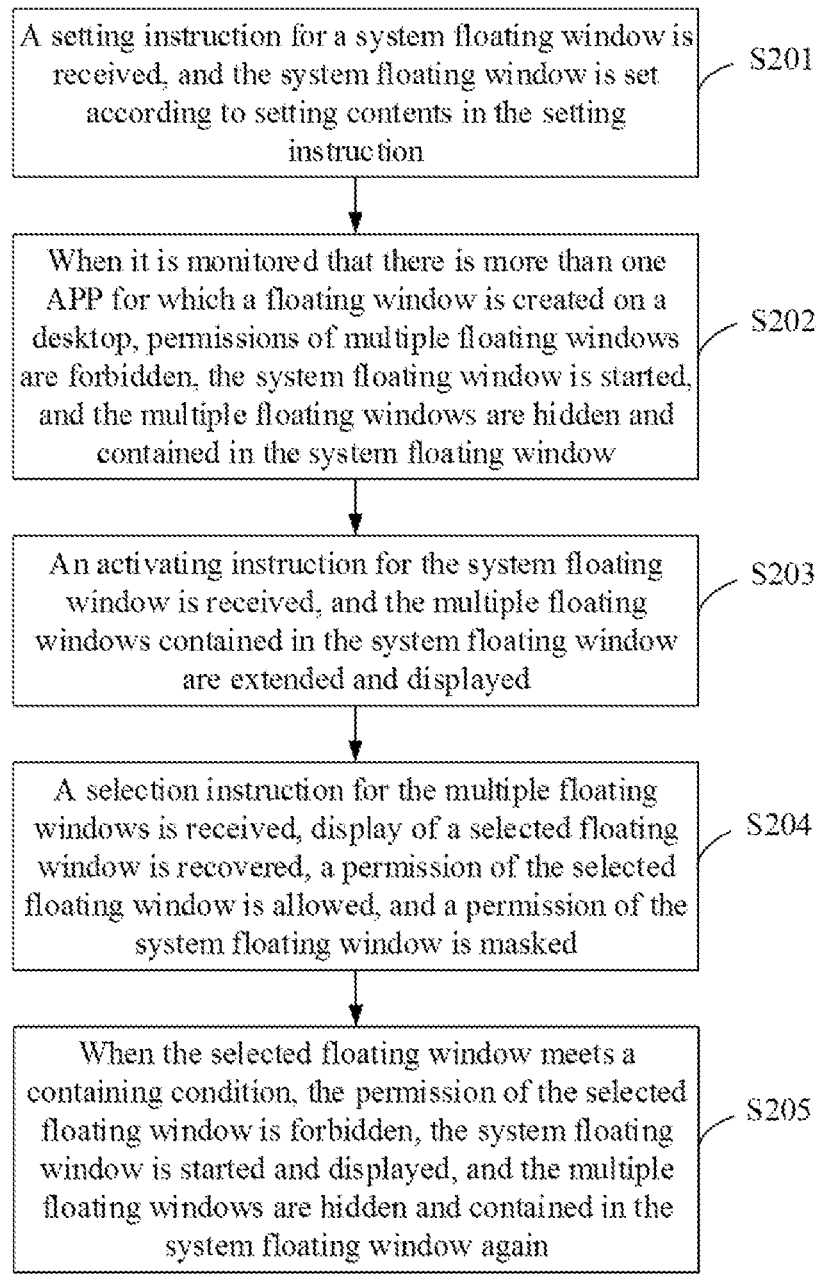
FIG. 4 is a flow chart showing a method for displaying a floating window, according to an exemplary aspect of the present disclosure.

On the basis of the aspect shown in FIG. 1, FIG. 4 is a flow chart showing a method for displaying a floating window, according to an exemplary aspect. As shown in FIG. 4, the method for displaying a floating window includes the following steps.

In step S201, a setting instruction for a system floating window is received, and the system floating window is set according to setting contents in the setting instruction.

The setting contents include a pattern of the system floating window, a starting condition of the system floating window, a pattern of extending and displaying the multiple floating windows contained in the system floating window, a containing condition, a parameter of the containing condition and the like. The pattern of the system floating window includes a size, shape, color, position and the like of the system floating window. The starting condition of the system floating window includes, for example, that there is more than one APP for which a floating window is created on a desktop, or, an unlocking operation over terminal equipment is detected. In a process of using the terminal equipment, a user creates a floating window for an APP according to his/her own requirement. If the user creates a floating window for only one APP, then the system floating window is not required to be started. If the user subsequently creates a floating window for another APP, then the system floating window is started. After the user masks a permission of the system floating window, if the user unlocks a screen of the terminal equipment after locking it, the system floating window is started and displayed.

The pattern of extending and displaying the multiple floating windows contained in the system floating window includes that: the multiple floating window contained in the system floating window are displayed around the system floating window, or the multiple floating windows contained in the system floating window are displayed abreast at a preset position, wherein the preset position may be an upper part, lower part, left part or right part of the system floating window.

The containing condition may include that: it is detected that a display time of a selected floating window reaches a first preset time, or a preset operation is detected. The preset operation may be any one of the following actions: an unlocking operation, a shaking operation or a pressing operation over a specific button. When a floating window meets the containing condition, the permission of the floating window is forbidden, and the floating window is contained in the system floating window. When there are multiple containing conditions, the terminal equipment may display all the multiple containing conditions for the user to be selected. After selecting a certain containing condition, the user sets a parameter of the containing condition. For example, if the containing condition selected by the user is that it is detected that the display time of the selected floating window reaches the first preset time, then the parameter of the containing condition is the first preset time, and the user is required to input the first preset time. If the containing condition selected by the user is that the preset operation is detected, the parameter of the containing condition is a preset action, and the user is required to select the preset action.

In step S202, when it is monitored that there is more than one APP for which a floating window is created on a desktop, permissions of multiple floating windows are forbidden, the system floating window is started, and the multiple floating windows are hidden and contained in the system floating window.

In step S203, an activating instruction for the system floating window is received, and the multiple floating windows contained in the system floating window are extended and displayed.

In step S204, a selection instruction for the multiple floating windows is received, display of a selected floating window is recovered, a permission of the selected floating window is allowed, and a permission of the system floating window is masked.

Specific implementation manners for steps S202 to S204 refer to related descriptions in the aspect shown in FIG. 1, and will not be elaborated herein.

In step S205, when the selected floating window meets a containing condition, the permission of the selected floating window is forbidden, the system floating window is started and displayed, and the multiple floating windows are hidden and contained in the system floating window again.

The containing condition includes that: it is detected that the display time of the selected floating window reaches the first preset time, or the preset operation is detected. The preset operation includes any one of the following actions: the unlocking operation, the shaking operation or the pressing operation over the specific button. For the former manner, the terminal equipment starts timing when display of the selected floating window is recovered, and when a counted time is equal to the first preset time, forbids the permission of the selected floating window, starts and displays the system floating window, and hides and contains the multiple floating windows in the system floating window again. The first preset time may be set by the user, and may also be specified by the system floating window. For the latter manner, after the terminal equipment recovers display of the selected floating window, the terminal equipment detects whether a preset action of screen locking, shaking, pressing over the specific button and the like is received; if the preset action is detected, forbids the permission of the selected floating window, starts and displays the system floating window, and hides and contains the multiple floating windows in the system floating window again.

In this aspect, when the selected floating window meets the containing condition, the permission of the selected floating window is forbidden, the system floating window is started and displayed, and the multiple floating windows are hidden and contained in the system floating window again, so that the user may implement rapid switching to another floating window through the system floating window.

Figure 5:
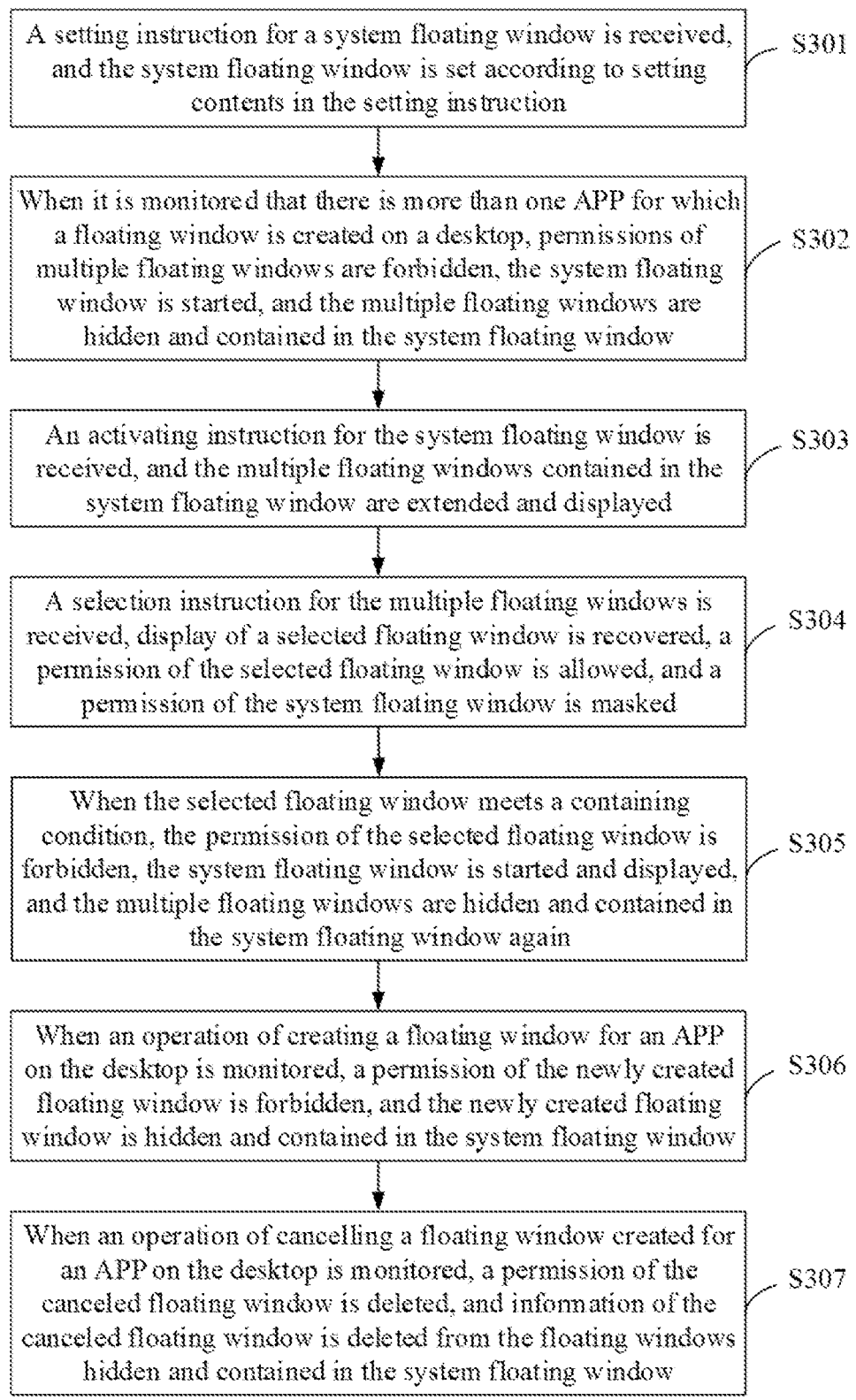
FIG. 5 is a flow chart showing a method for displaying a floating window, according to an exemplary aspect of the present disclosure.

On the basis of the aspect shown in FIG. 4, FIG. 5 is a flow chart showing a method for displaying a floating window, according to an exemplary aspect. As shown in FIG. 5, the method for displaying a floating window includes the following steps.

In step S301, a setting instruction for a system floating window is received, and the system floating window is set according to setting contents in the setting instruction.

In step S302, when it is monitored that there is more than one APP for which a floating window is created on a desktop, permissions of multiple floating windows are forbidden, the system floating window is started, and the multiple floating windows are hidden and contained in the system floating window.

In step S303, an activating instruction for the system floating window is received, and the multiple floating windows contained in the system floating window are extended and displayed.

In step S304, a selection instruction for the multiple floating windows is received, display of a selected floating window is recovered, a permission of the selected floating window is allowed, and a permission of the system floating window is masked.

In step S305, when the selected floating window meets a containing condition, the permission of the selected floating window is forbidden, the system floating window is started and displayed, and the multiple floating windows are hidden and contained in the system floating window again.

In step S306, when an operation of creating a floating window for an APP on the desktop is monitored, a permission of the newly created floating window is forbidden, and the newly created floating window is hidden and contained in the system floating window.

A user may create a floating window for an APP anytime according to his/her own requirement, and terminal equipment may contain the newly created floating window in the system floating window.

In step S307, when an operation of cancelling (e.g., terminating) a floating window created for an APP on the desktop is monitored, a permission of the canceled floating window is deleted (e.g., removed), and information of the canceled floating window is deleted from the floating windows hidden and contained in the system floating window.

If the user cancels the floating window of a certain APP, the terminal equipment may delete all contents about the canceled floating window.

It is important to note that both the steps S306 and S307 may be executed, only one of them may also be executed, and there is no sequence for execution of steps S306 and S307.

In this aspect, when the operation of creating the floating window for the APP on the desktop is monitored, the permission of the newly created floating window is forbidden, and the newly created floating window is hidden and contained in the system floating window. When the operation of canceling the floating window created for the APP on the desktop is monitored, the permission of the canceled floating window is deleted, and the information of the canceled floating window is deleted from the floating windows hidden and contained in the system floating window. Therefore, the system floating window may be conveniently updated.

Figure 6:
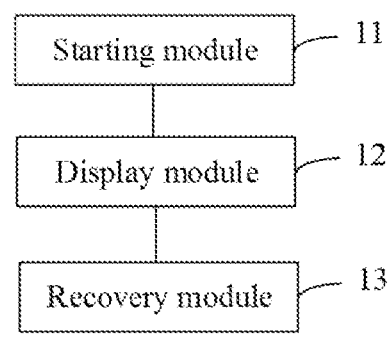
FIG. 6 is a block diagram of a device for displaying a floating window, according to an exemplary aspect of the present disclosure.

FIG. 6 is a block diagram of a device for displaying a floating window, according to an exemplary aspect. As shown in FIG. 6, the device of the aspect includes:

a starting module 11, configured to, when it is monitored that there is more than one APP for which a floating window is created on a desktop, forbid permissions of multiple floating windows, start a system floating window, and hide and contain the multiple floating windows in the system floating window;

a display module 12, configured to receive an activating instruction for the system floating window, and extend and display the multiple floating windows contained in the system floating window; and a recovery module 13, configured to receive a selection instruction for the multiple floating windows, recover display of a selected floating window, allow a permission of the selected floating window, and mask a permission of the system floating window.

Figure 7:
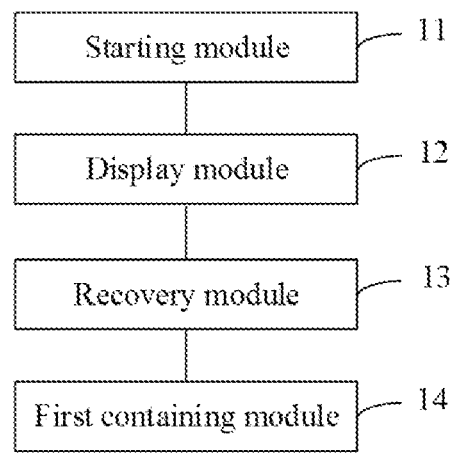
FIG. 7 is a block diagram of a device for displaying a floating window, according to an exemplary aspect of the present disclosure.

FIG. 7 is a block diagram of a device for displaying a floating window, according to an exemplary aspect. On the basis of the device shown in FIG. 6, as shown in FIG. 7, the device in this aspect further includes:

a first containing module 14, configured to, when the selected floating window meets a containing condition, forbid the permission of the selected floating window, start and display the system floating window, and hide and contain the multiple floating windows in the system floating window again.

Optionally, the containing condition includes that: it is detected that a display time of the selected floating window reaches a first preset time, or a preset operation is detected. The preset operation includes any one of the following actions: an unlocking operation, a shaking operation, or a pressing operation over a specific button.

Figure 8:
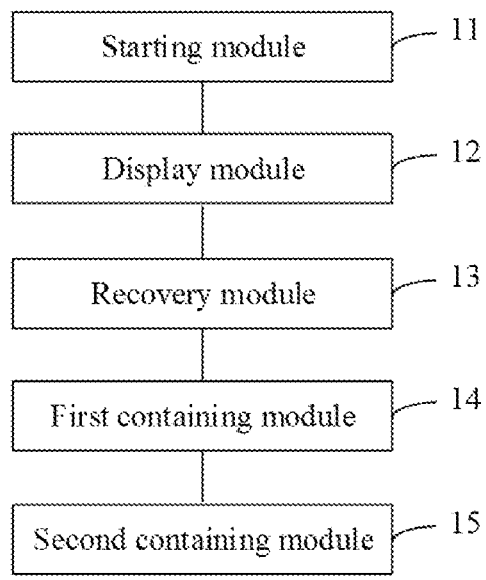
FIG. 8 is a block diagram of a device for displaying a floating window, according to an exemplary aspect of the present disclosure.

FIG. 8 is a block diagram of a device for displaying a floating window, according to an exemplary aspect. On the basis of the device shown in FIG. 7, as shown in FIG. 8, the device in this aspect further includes:

a second containing module 15, configured to, when an operation of creating a floating window for an APP on the desktop is monitored, forbid a permission of the newly created floating window, and hide and contain the newly created floating window in the system floating window.

Figure 9:
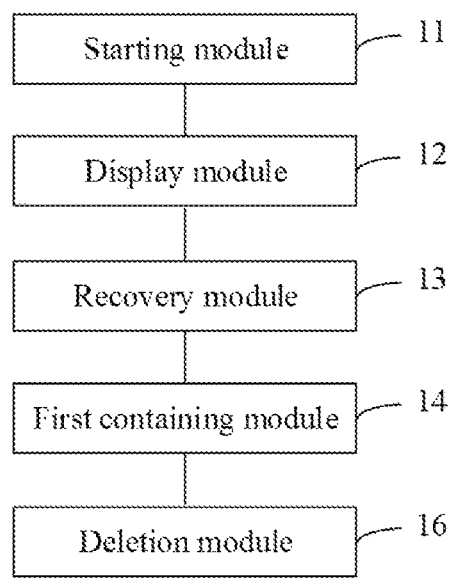
FIG. 9 is a block diagram of a device for displaying a floating window, according to an exemplary aspect of the present disclosure.

FIG. 9 is a block diagram of a device for displaying a floating window, according to an exemplary aspect. On the basis of the device shown in FIG. 7, as shown in FIG. 9, the device in this aspect further includes:

a deletion module 16, configured to, when an operation of cancelling a floating window created for an APP on the desktop is monitored, delete a permission of the canceled floating window, and delete information of the canceled floating window from the floating windows hidden and contained in the system floating window.

Figure 10:
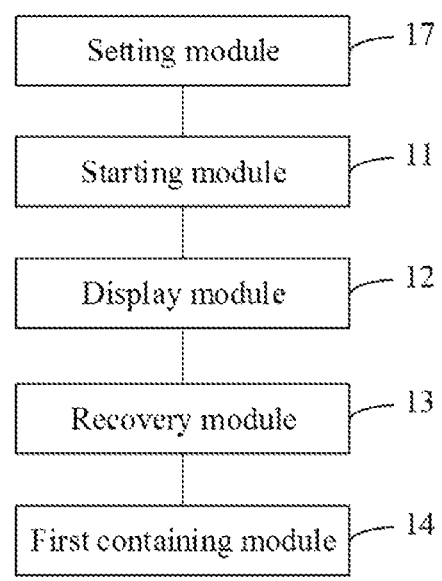
FIG. 10 is a block diagram of a device for displaying a floating window, according to an exemplary aspect of the present disclosure.

FIG. 10 is a block diagram of a device for displaying a floating window, according to an exemplary aspect. On the basis of the device shown in FIG. 7, as shown in FIG. 10, the device in this aspect further includes:

a setting module 17, configured to receive a setting instruction for the system floating window, and set the system floating window according to setting contents in the setting instruction.

Each function module in the floating window display devices shown in FIG. 6 to FIG. 10 may be configured to execute the methods for displaying a floating window shown in FIG. 1 to FIG. 3, and specific implementation manners and technical effects are similar, refer to the abovementioned method aspects, and will not be elaborated herein.

Figure 11:
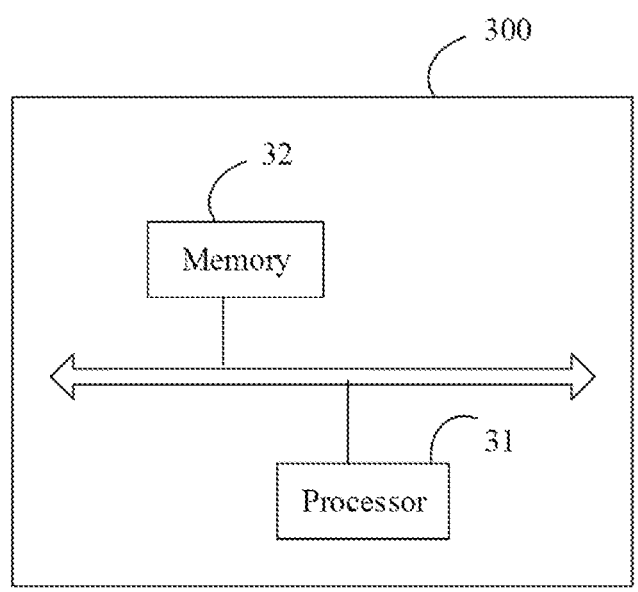
FIG. 11 is an entity block diagram of a device for displaying a floating window, according to an exemplary aspect of the present disclosure.

FIG. 11 is an entity block diagram of a device for displaying a floating window, according to an exemplary aspect. As shown in FIG. 11, the floating window display device 300 includes: a memory 32 and a processor 31, wherein a computer instruction is stored in the memory 32, and the processor 31 runs the computer instruction to execute the steps of the methods in the aspects shown in FIG. 1, FIG. 4 and FIG. 5.

It should be understood that, in the aspect, the processor may be a Central Processing Unit (CPU), and may also be another universal processor, a Digital Signal Processor (DSP), an Application Specific Integrated Circuit (ASIC) and the like. The universal processor may be a microprocessor or the processor may also be any conventional processor and the like. The memory may be a Read-Only Memory (ROM), a Random Access Memory (RAM), a flash memory, a hard disk or a solid-state disk. The steps of the method in the aspects of the present disclosure may be directly executed by a hardware processor or executed by combining hardware and software modules in the processor.

Figure 12:
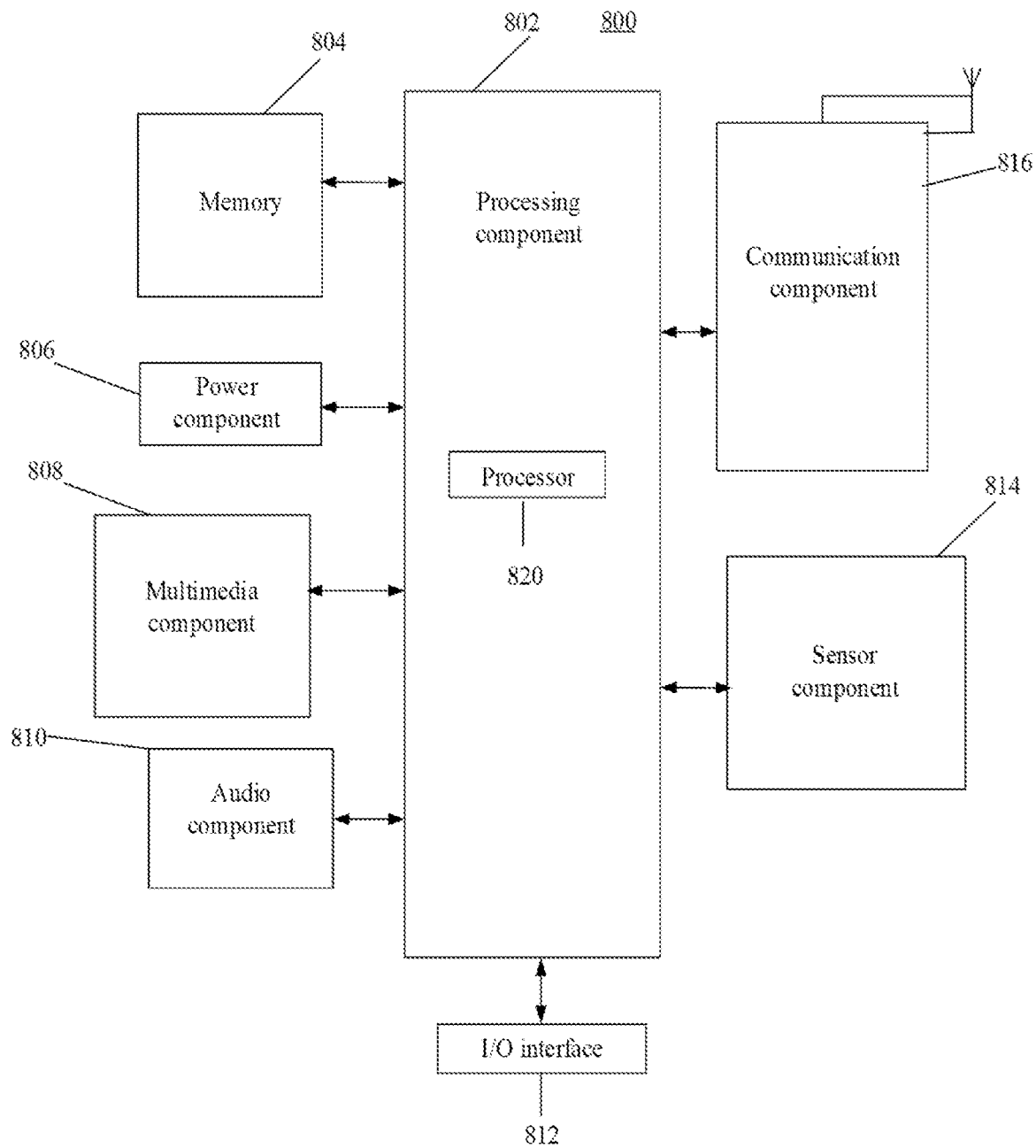
FIG. 12 is a block diagram of a device for displaying a floating window 800, according to an exemplary aspect of the present disclosure.

FIG. 12 is a block diagram of a device for displaying a floating window 800, according to an exemplary aspect. For example, the device 800 may be a mobile phone, a computer, a digital broadcast terminal, a messaging device, a gaming console, a tablet, a medical device, exercise equipment, a PDA and the like.

Referring to FIG. 12, the device 800 may include one or more of the following components: a processing component 802, a memory 804, a power component 806, a multimedia component 808, an audio component 810, an Input/Output (I/O) interface 812, a sensor component 814, or a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any APP programs or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a ROM, a magnetic memory, a flash memory, and a magnetic or optical disk.

The power component 806 provides power for various components of the device 800. The power component 806 may include a power management system, one or more power supplies, and other components associated with the generation, management and distribution of power for the device 800.

The multimedia component 808 includes a screen providing an output interface between the device 800 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some aspects, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may be further stored in the memory 804 or sent through the communication component 816. In some aspects, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800. The sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS)

or Charge Coupled Device (CCD) image sensor, configured to be used in an imaging application. In some aspects, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a Wireless Fidelity (WiFi) network, a 2nd-Generation (2G) or 3rd-Generation (3G) network or a combination thereof. In an exemplary aspect, the communication component 816 receives a broadcast signal or broadcast associated information from an external broadcast management system through a broadcast channel. In an exemplary aspect, the communication component 816 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an exemplary aspect, the device 800 may be implemented by one or more ASICs, DSPs, Digital Signal Processing Devices (DSPDs), Programmable Logic Devices (PLDs), Field Programmable Gate Arrays (FPGAs), controllers, micro-controllers, microprocessors or other electronic components, and is configured to execute the methods for displaying a floating window shown in FIG. 1, FIG. 4 and FIG. 5.

In an exemplary aspect, there is also provided a non-transitory computer-readable storage medium including an instruction, such as the memory 804 including an instruction, and the instruction may be executed by the processor 820 of the device 800 to implement the methods for displaying a floating window shown in FIG. 1, FIG. 4 and FIG. 5. For example, the non-transitory computer-readable storage medium may be a ROM, a RAM, a Compact Disc Read-Only Memory (CD-ROM), a magnetic tape, a floppy disc, optical data storage equipment and the like.

A computer instruction is stored on a computer-readable storage medium, and the instruction is executed by a processor to implement the steps of the methods in the aspects shown in FIG. 1, FIG. 4 and FIG. 5.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for displaying a floating window, comprising:
monitoring a number of floating windows that are created on a desktop for respective ones of a plurality of applications;
determining that there is more than a predetermined number of the plurality of applications for which a floating window is created on the desktop;
forbidding displaying of multiple floating windows based on the determination;
launching a system floating window;
hiding and containing the multiple floating windows in the system floating window;
receiving an activating instruction for the system floating window;
extending and displaying the multiple floating windows contained in the system floating window;
receiving a selection instruction for at least one of the multiple floating windows;
displaying one or more selected floating windows of the multiple floating windows;
and
masking display of the system floating window.

2. The method of claim 1, further comprising:
determining that the selected floating window meets a containing condition;
forbidding displaying of the selected floating window based on the determination;
starting and displaying the system floating window; and
hiding and containing the multiple floating windows in the system floating window.

3. The method of claim 2, wherein the containing condition includes one of (i) a detection that a display time of the selected floating window reaches a first preset time, and (ii) a detection of a preset operation,
wherein the preset operation includes any one of an unlocking operation, a shaking operation, and a pressing operation over a specific button.

4. The method of claim 1, further comprising:
detecting an operation of creating a new floating window for one of the plurality of applications on the desktop;
forbidding displaying of the new floating window based on the detection; and
hiding and containing the new floating window in the system floating window.

5. The method of claim 1, further comprising:
detecting an operation of terminating a previously created floating window for one of the plurality of applications on the desktop;
terminating the previously created floating window; and
removing information of the terminated floating window from the system floating window.

6. The method of claim 1, further comprising:
receiving a setting instruction for the system floating window; and
setting the system floating window based on setting contents in the setting instruction.

7. A device for displaying a floating window, comprising:
a processor; and
a memory for storing instructions executable by the processor, wherein the processor is configured to:
    monitor a number of floating windows that are created on a desktop for respective ones of a plurality of applications;
    determine that there is more than a predetermined number of the plurality of applications for which a floating window is created on the desktop;
    forbid displaying of multiple floating windows based on the determination;
    launch a system floating window;
    hide and contain the multiple floating windows in the system floating window;
    receive an activating instruction for the system floating window;
    extend and display the multiple floating windows contained in the system floating window;
    receive a selection instruction for at least one of the multiple floating windows;
    display one or more selected floating windows of the multiple floating windows;
    and
    mask display of the system floating window.

8. The device of claim 7, wherein the processor is further configured to:
    determine that the selected floating window meets a containing condition;
    forbid displaying of the selected floating window based on the determination;
    start and display the system floating window; and
    hide and contain the multiple floating windows in the system floating window.

9. The device of claim 8, wherein the containing condition includes one of (i) a detection that a display time of the selected floating window reaches a first preset time, and (ii) a detection of a preset operation,
    wherein the preset operation includes any one of an unlocking operation, a shaking operation, and a pressing operation over a specific button.

10. The device of claim 7, wherein the processor is further configured to:
    detect an operation of creating a new floating window for one of the plurality of applications on the desktop;
    forbid displaying of the new floating window based on the detection; and
    hide and contain the new floating window in the system floating window.

11. The device of claim 7, wherein the processor is further configured to:
    detect an operation of terminating a previously created floating window for one of the plurality of applications on the desktop;
    terminate the previously created floating window; and
    remove information of the terminated floating window from the system floating window.

12. The device of claim 7, wherein the processor is further configured to:
    receive a setting instruction for the system floating window; and
    set the system floating window based on setting contents in the setting instruction.

13. A non-transitory computer-readable storage medium having stored therein instructions that, when executed by a processor of a terminal equipment, cause the terminal equipment to:
    monitor a number of floating windows that are created on a desktop for respective ones of a plurality of applications;
    determine that there is more than a predetermined number of the plurality of applications for which a floating window is created on the desktop;
    forbid displaying of multiple floating windows based on the determination;
    launch a system floating window;
    hide and contain the multiple floating windows in the system floating window;
    receive an activating instruction for the system floating window;
    extend and display the multiple floating windows contained in the system floating window;
    receive a selection instruction for at least one of the multiple floating windows;
    display one or more selected floating windows of the multiple floating windows;
    and
    mask display of the system floating window.

14. The non-transitory computer-readable storage medium of claim 13, wherein the instructions further cause the terminal to:
    determine that the selected floating window meets a containing condition;
    forbid displaying of the selected floating window based on the determination;
    start and display the system floating window; and
    hide and contain the multiple floating windows in the system floating window.

15. The non-transitory computer-readable storage medium of claim 14, wherein the containing condition includes one of (i) a detection that a display time of the selected floating window reaches a first preset time, and (ii) a detection of a preset operation,
    wherein the preset operation includes any one of an unlocking operation, a shaking operation, and a pressing operation over a specific button.

16. The non-transitory computer-readable storage medium of claim 13, wherein the instructions further cause the terminal to:
    detect an operation of creating a new floating window for one of the plurality of applications on the desktop;
    forbid displaying of the new floating window based on the detection; and
    hide and contain the new floating window in the system floating window.

17. The non-transitory computer-readable storage medium of claim 13, wherein the instructions further cause the terminal to:
    detect an operation of terminating a previously created floating window for one of the plurality of applications on the desktop;
    terminate the previously created floating window; and
    remove information of the terminated floating window from the system floating window.

18. The non-transitory computer-readable storage medium of claim 13, wherein the instructions further cause the terminal to:
    receive a setting instruction for the system floating window; and
    set the system floating window based on setting contents in the setting instruction.

\* \* \* \* \*